United States Patent Office 2,925,341
Patented Feb. 16, 1960

2,925,341

ANIMAL FOODSTUFFS

Kurt Kaemmerer, Wuppertal-Sonnborn, Germany, assignor to Farbenfabriken Bayer Aktiengesellschaft, Leverkusen, Germany, a corporation of Germany No Drawing. Application January 31, 1957
Serial No. 637,370

Claims priority, application Germany February 4, 1956

3 Claims. (Cl. 99—2)

This invention relates to feeds for animals and more particularly it relates to a feed supplement containing auxines, heteroauxines or calines.

For some years there has been extensive study of the need for various nutrients in feed for poultry and livestock. This study has resulted in the evolution of feeds compounded to include all of the ingredients necessary to provide the proper proportions of materials such as, for example, proteins, carbohydrates, minerals, vitamins, etc. as well as the formulation of rations designed for specific feeding purposes. Following the development of rations balanced in essential nutrients, it was found that other substances could be included in the ration which would serve as growth promoters and increase the rate at which livestock developed, resulting in a larger animal at an earlier age. Growth promoters commonly employed by feed manufacturers include vitamin $B_{12}$, animal protein factor, commonly referred to as "APF," etc. Recently it has been found that the inclusion of certain antibiotics such as bacitracin, penicillin, oxytetracyclin or chlortetracyclin in feed supplements acts to give an additional growth promoting effect and aids in producing larger animals at an earlier age than can be done with feeds containing only the vitamin $B_{12}$ of APF as supplements.

We have now discovered that certain auxines, heteroauxines or calines constitute a new growth-promoting feed supplement of superior efficiency in its growth-promoting effect. Their use enables the production of larger animals in a shorter time than heretofore achieved. Additionally these growth-promoting supplements permit considerable savings of other nutrients in the feed of cattle and other livestock, chickens and other poultry.

The invention is a feed supplement containing as its essential active ingredients such auxines, heteroauxines and compounds of the bios-group like the biotin known as vitamin H, which have a specific activity on the multiplication and the growth of the cells of plants. Such compounds are for instance: α-naphthyl acetic acid and its salts, 2-methyl-chloro-phenoxy acetic acid and its salts, 2,4-dichloro-phenoxy acetic acid and its salts, 4-phenyl acetic acid and its salts, further β'-indolyl acetic acid and phenoxy acetic acid and their salts. The amounts of active ingredients contained in animal feed according to the invention are between 0.0005 and 0.005 percent calculated on the dry weight of the feed.

The following examples illustrate the invention without it being limited thereto.

*Example 1*

The addition of the auxines to the animal feed permits to favorably influence the paunch flora of ruminants and to stimulate an increased protein production. This can be established by the fermentation process in the artificial paunch. The following table shows the range of activity of some of the auxines suggested as feed supplements according to the invention and also shows the increase of the protein formation.

| | active ingredient | range of activity in mg. per 125 ml. | optimum concentration in mg. per 125 ml. | protein formation in percent | |
|---|---|---|---|---|---|
| | | | | without growth | with promoter |
| (1) | sodium-α-naphthyl acetate. | 1–60 | 20 | 100 | +208 |
| (2) | sodium-2-methyl-4-chloro-phenoxy acetate. | 1–60 | 25 | 100 | +465 |
| (3) | 2,4-dichlorophenoxy acetic acid. | 1–40 | 30 | 100 | +542 |
| (4) | sodiumphenyl acetate. | 1–50 | 20 | 100 | +230 |
| (5) | β'-indolyl acetic acid. | 0.1–20 | 1 | 100 | +393 |

*Example 2*

In a poultry feed used for the raising of chickens small amounts of auxines are added. It is found that the chickens show improved growth response inside the same period of feeding compared with the controls which have been fed without these supplements. At the same time the chickens have a smaller feed consumption.

| | active ingredient | percent in feed | average weight increase inside 4 weeks | percent improvement of increase in comparison with No. 7 | percent improvement in feed utilization for 100 grams in comparison with No. 7 |
|---|---|---|---|---|---|
| (1) | sodium-α-naphthyl acetate | 0.001 | 423 | 74.8 | 28.2 |
| (2) | sodium-2-methyl-4-chloro acetate. | 0.001 | 414 | 71.1 | 24.9 |
| (3) | 2,4-dichlorophenoxy acetic acid. | 0.001 | 432 | 78.5 | 31.3 |
| (4) | sodium phenyl acetate. | 0.005 | 430 | 77.7 | 28.5 |
| (5) | indolyl acetic acid | 0.001 | 433 | 78.9 | 29.1 |
| (6) | control | 0 | 348 | 43.8 | 21.4 |
| (7) | control deficiently fed with animal protein. | 0 | 242 | 0 | 0 |

This table shows the action of the feed supplements in the raising of chickens. The basic feed contains 16.3% of total protein, 2% of animal protein, 70.4% of total nutrients. Group 7 obtained a deficient feed of 16.44% of total proteins without animal protein and a total nutrient amount of 70.6%. The average starting weight of the chickens was 112 grams.

*Example 3*

During the raising of chickens the feed was supplemented by the addition of 0.002–0.004% of sodium-phenoxy acetate. In the same period of feeding higher weight increase and an improved utilisation of the feed was achieved in comparison with the controls.

| | active ingredient | concentration of the active ingredient in percent | percent of weight increase in 4 weeks in grams | additional weight increase compared with the controls in percent | percent of improved feed utilisation |
|---|---|---|---|---|---|
| (1) | sodium-phenoxy acetate. | 0.002 | 285.7 | +11.3 | +5.4 |
| (2) | sodium-phenoxy acetate. | 0.004 | 311.6 | +21.5 | +5.9 |
| (3) | control | | 256.59 | | |

The starting weight of the chickens was 121 grams per animal. The duration of the experiment was 4 weeks, the feed ration was 16.6% of crude protein wth 2% of animal protein.

I claim:

1. A livestock feed comprising a nutrient feed mixed with an amount of an auxine selected from the group consisting of α-naphthyl acetic acid, 2-methyl-4-chloro phenoxy acetic acid, phenoxy acetic acid, indolyl acetic acid and their salts, sufficient to produce thereby a positive growth-promoting effect and being less than a toxic amount.

2. A livestock feed comprising a nutrient feed mixed with from about 0.0005 to about 0.005 percent of an auxine selected from the group consisting of α-naphthyl acetic acid, 2-methyl-4-chloro-phenoxy acetic acid, 2,4-dichlorophenoxy acetic acid, phenoxy acetic acid, indolyl acetic acid and their salts.

3. A livestock feed comprising a nutrient feed mixed with from about 0.001 to about 0.005 percent of an auxine selected from the group consisting of α-naphthyl acetic acid, 2-methyl-4-chloro phenoxy acetic acid, 2,4-dichlorophenoxy acetic acid, phenoxy acetic acid, indolyl acetic acid and their salts.

References Cited in the file of this patent

Chem. Abst. 45: 228H.

Rowe et al.: American J. of Veterinary Research, vol. 15, October 1945, pp. 622–9.

UNITED STATES PATENT OFFICE

CERTIFICATE OF CORRECTION

Patent No. 2,925,341                February 16, 1960

Kurt Kaemmerer

It is hereby certified that error appears in the printed specification of the above numbered patent requiring correction and that the said Letters Patent should read as corrected below.

Column 2, line 46, for "16.3%" read -- 16.63% --.

Signed and sealed this 23rd day of August 1960.

(SEAL)
Attest:
KARL H. AXLINE
Attesting Officer

ROBERT C. WATSON
Commissioner of Patents